United States Patent [19]

Buck et al.

[11] Patent Number: 4,983,364
[45] Date of Patent: Jan. 8, 1991

[54] MULTI-MODE COMBUSTOR

[76] Inventors: F. A. Mackinnon Buck, 4058 Southview Dr., San Diego, Calif. 92117; Detlev E. M. Hasselmann, 519 S. Nardo Ave., Solana Beach, Calif. 92075; Paul D. Labonte, 9371 Fermi Ave., San Diego, Calif. 92123

[21] Appl. No.: 74,685

[22] Filed: Jul. 17, 1987

[51] Int. Cl.$^5$ .............................................. B01J 8/02
[52] U.S. Cl. ................................. 422/189; 422/171; 422/173; 422/177; 422/180; 422/182; 422/900; 423/210; 423/245.3; 431/5; 431/220
[58] Field of Search ....................... 431/5, 220; 422/168–174, 177, 180, 181, 182, 183, 900, 189; 423/210, 245.3

[56] References Cited

U.S. PATENT DOCUMENTS

| | | | |
|---|---|---|---|
| 2,898,201 | 8/1959 | Hayes | 422/170 |
| 3,428,434 | 2/1969 | Hurko | 422/171 |
| 3,476,524 | 11/1969 | Burke | 422/172 |
| 3,806,322 | 4/1974 | Tabak | 422/170 |
| 3,897,193 | 7/1975 | Kattan et al. | 431/5 |
| 3,914,088 | 10/1975 | Huyck | 431/5 |
| 3,914,095 | 10/1975 | Straitz, III | 431/202 |
| 3,979,175 | 9/1976 | Kattan et al. | 431/5 |
| 4,009,985 | 3/1977 | Hirt | 431/5 |
| 4,087,228 | 5/1978 | Datis | 431/5 |
| 4,101,632 | 7/1978 | Lamberti et al. | 431/5 |
| 4,118,170 | 10/1978 | Hirt | 431/5 |
| 4,183,407 | 1/1980 | Knopik | 166/314 |
| 4,213,947 | 7/1980 | Fremont et al. | 431/5 |
| 4,292,020 | 9/1981 | Hirt | 431/5 |
| 4,425,159 | 1/1984 | Nixon | 431/5 |
| 4,444,735 | 4/1984 | Brimingham et al. | 431/5 |
| 4,885,140 | 12/1990 | Brown | 422/174 |

Primary Examiner—Robert J. Warden
Assistant Examiner—Timothy M. McMahon
Attorney, Agent, or Firm—Baker, Maxham, Jester & Meador

[57] ABSTRACT

An optimized thermal/catalytic combuster for the efficient oxidation of volatile organic compounds (VOC) in air. As an example, the invention is directly applicable to remedial action for clean-up of ground sites contaminated by spills or leaks of gasoline, organic paint solvents and the like, by a process known as air extraction. A thermal combuster and a catalytic oxidizer are interconnected by piping and control valves so that when one such element operates, the other is quiescent, depending on the concentration of combustible vapors in the extracted air. A dilution air valve, a heat exchanger, an electric heater, or a connection to a supplemental supply of clean-burning fuel, or all these devices, may be provided to ensure efficient operation. In an alternative embodiment, an internal combustion engine may be used in place of the thermal combuster. The engine can be used to supply power for other uses within the system or for external use. In a further alternative, a basic vapor contamination abatement system addressed specifically to extraction vapors from contaminated soils comprises a vacuum pump/compressor transmitting the vapors from the soil to a catalytic oxidizer, without use of a thermal combuster.

34 Claims, 2 Drawing Sheets

MULTI-MODE COMBUSTOR

FIELD OF THE INVENTION

This invention relates generally to clean-up of air contaminated by volatile organic compounds (VOC), and as an example to a system to produce a clean vent stream, by means of combustion processes, from extraction vapor produced by air extraction of gasoline contaminated soils.

BACKGROUND OF THE INVENTION

It has been found, whether due to leaks or spills, that the soil conditions under and around underground fuel storage tanks frequently included fuel or other VOC contaminants. Test borings can be advantageously employed to determine the presence of such contamination, as determined by the concentration of hydrocarbons and other compounds. Such tests can be used to determine total fuel hydrocarbons, as well as concentrations of specific contaminants such as benzene, toluene and xylene. The tests have shown that often the majority of such contaminants reside in the soil above a depth of forty feet. However, soil and leak rate conditions or volume of spill determine the depth of contamination.

The normal procedure when soil contamination is detected is to determine the cause and achieve a remedy. Then the soil must be decontaminated. A common practice for doing so has been to excavate the contaminated soils and dispose of them at a facility approved for acceptance of hazardous waste. That, of course, has high direct costs, and could interrupt normal business operation for several days, possibly even as long as several weeks Vapor extraction systems for removing VOC contaminants from soil in situ have been developed and proven to be effective. The vapors are collected as extraction gas and removed therefrom by several possible means, including carbon adsorption, incineration and catalytic oxidation. Catalytic combustion may be the preferred process according to some experts but applicability is constrained within certain limits For example, if the concentration of hydrocarbon vapors exceeds 25% of the lower explosive limit (L.E.L.) for gasoline, heat given off during oxidation raises the temperature of the catalytic combuster to a point of destruction. To a certain extent control of the temperature may be obtained by using dilution air ahead of the catalytic combuster, but this method of temperature control is not practical at the high concentrations of VOC vapor expected during the early phase of the vapor extraction process.

Adsorption of VOC vapors on activated carbon has been found not to be a satisfactory solution for the disposal of recovered vapors. In this process vapors are merely concentrated on a solid bed which must be periodically backflushed to rejuvenate the carbon. The problem of dealing with hydrocarbon contaminants then arises all over again.

SUMMARY OF THE INVENTION

It is an object of the invention to provide a multi-stage combustion system in which optimum efficiency is obtained while minimizing costs for final disposal of VOC contaminants. This system employs a combination of incineration and catalytic oxidation, selectively actuated, to accommodate different VOC concentrations during the vapor recovery process. The system can operate efficiently with any VOC concentration in the extraction vapor.

An important purpose is to treat contaminated soils in place, thereby saving greatly in money and lost facility operating time. This can be achieved by circulating air through the soil to recover vapors and accelerate natural degradation of fuels by soil bacteria. Active vapor extraction wells using negative pressure (vacuum) can provide the driving force for circulation.

To achieve this and other objectives, one or more of the following processes or steps are employed. At the beginning of the clean-up process, the first extraction vapor, which is richest in VOC, enables the flame in a thermal combuster to be self-sustaining. As the extraction process proceeds, the VOC concentration normally falls, often after several days or weeks. To sustain combustion and thereby continue the clean-up process, enrichment fuel gas may be added when the VOC concentration falls below the level necessary to keep the combustion self-sustaining.

As the concentration falls even lower, the extraction vapor is switched from the thermal combuster to the catalytic oxidizer. A dilution air value is provided to be used if necessary to prevent overheating of the catalyst. Under certain conditions, operation of the first catalyst chamber at an efficient temperature may cause the exothermic heat of oxidation to overheat the second catalyst bed. To address this problem an interstage cooler on the partially oxidized extraction vapor, may be used between the first and second stages of the catalytic oxidizer. Alternatively, additional dilution air may be injected between the two catalyst stages by means of a small blower or fan.

Over an intermediate range of the concentration the catalytic oxidizer, with its internal heat exchanger, operates efficiently without the application of external energy except for nearly adiabatic heat from the compressor.

At still lower VOC concentrations, until the extraction process is complete, the catalytic oxidizer operates efficiently, normally using three heat inputs, namely: (1) heat of compression; (2) heat of combustion by heat exchange; and (3) preheat from a clean burning fuel or electric heaters. In some cases, both electric power and supplementary fuel may be advantageous. A specific application of the dual preheat concept arises in catalytic reactors using electric power as the primary preheat device. When the combustible gas content of the extracted vapors is low, preheater capacity may become the limiting factor in overall extraction vapor flow rate. A way to solve this problem is to add a clean burning supplementary fuel to the extraction vapors. Heat from oxidation of the supplemental fuel is picked up by the extraction vapors in the heat exchanger, increasing the temperature of the extraction vapors entering the catalytic oxidizer, thereby increasing the operational flow rate above the limit imposed by the preheater capacity.

BRIEF DESCRIPTION OF THE DRAWING

The objects, advantages and features of the invention will be more fully understood from the following detailed description, when read in conjunction with the accompanying drawing, in which.

DESCRIPTION OF THE PREFERRED EMBODIMENTS

For purposes of illustration, the following discussion will center around clean up of an area in the vicinity of gasoline storage tanks at a filling station where there has been a leak and there is some gasoline saturated soil. An extracted vapor, containing combustible gasoline constituents, is produced by an in-situ vapor extraction process. The application of the invention is to convert these constituents to carbon dioxide and water vapor and to thereby avoid contamination of the air. It will be understood that the application of the invention is similar for the clean up of any volatile organic compound (VOC) from any spill or leak or from an industrial ventilation process.

Figure 1:
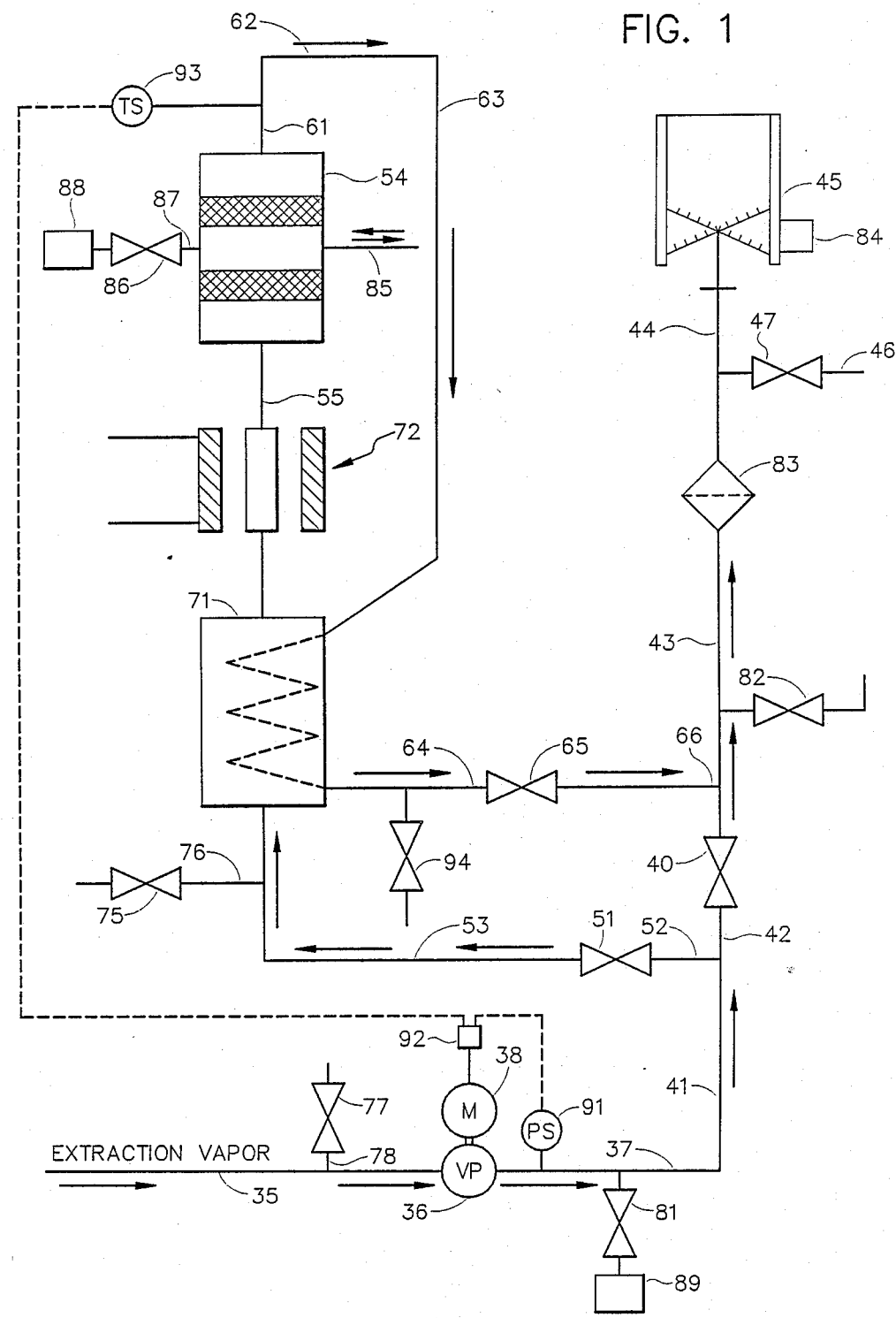
FIG. 1 is a schematic representation of the air treatment system of the invention, employing the contaminated air output of a vapor extraction system.
Figure 2:
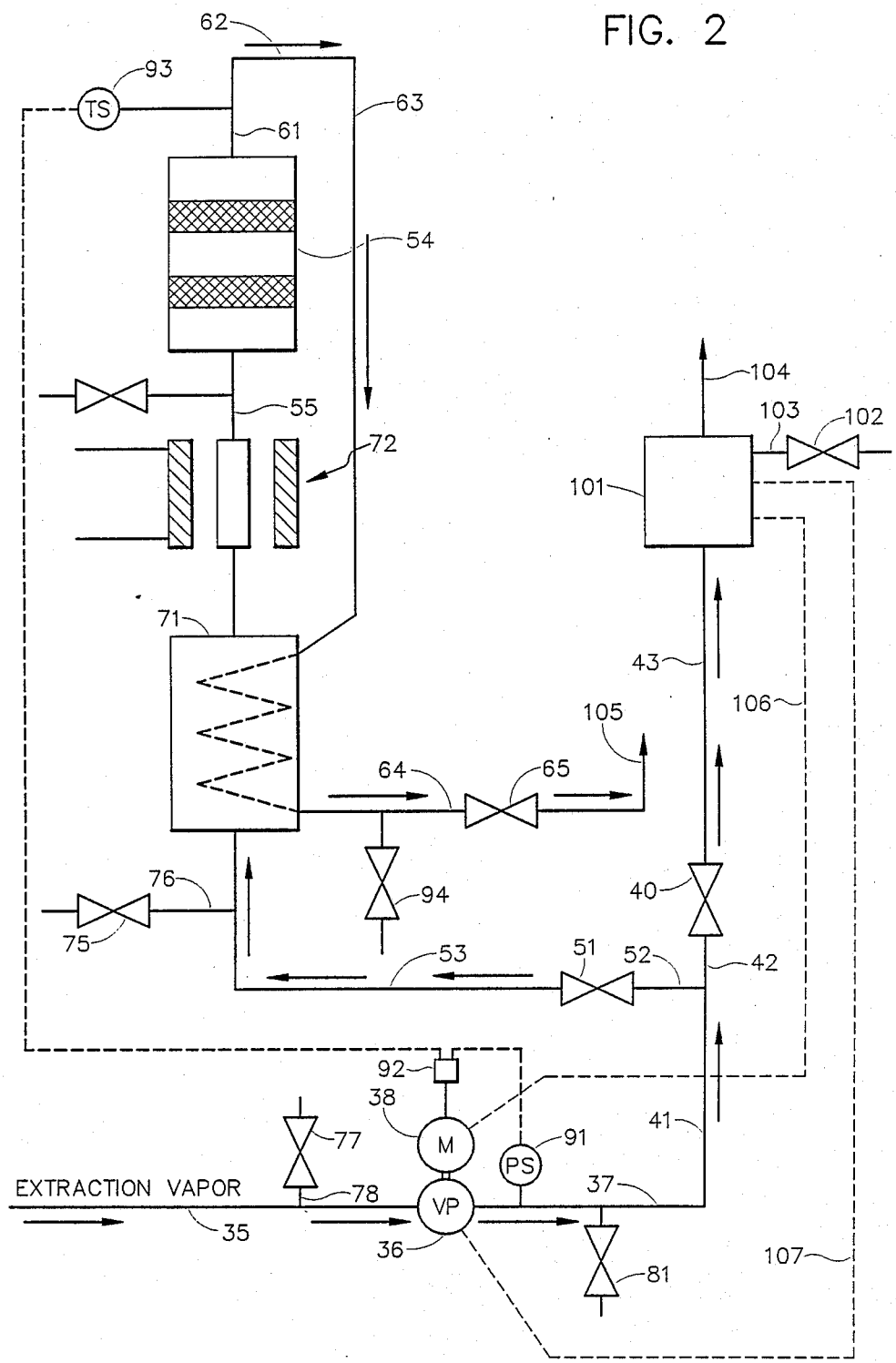
FIG. 2 is a partial schematic of an alternative embodiment of the system of the invention.

To return to the illustrative case, the invention as shown in FIGS. 1 and 2 is primarily concerned with the method and apparatus for removing hydrocarbon vapors from air. As stated previously, the currently accepted ways for accomplishing this removal of hydrocarbons, is carbon adsorption, incineration and catalytic oxidation. The drawbacks of adsorption have already been discussed. Catalytic oxidation might well be the process of choice but it cannot normally be used where the hydrocabon vapors exceed an upper concentration limit. Therefore, the present invention is a controlled combination of incineration and catalytic oxidation where a thermal combuster is used when the hydrocarbon concentration is relatively high and a catalytic oxidizer is used when the hydrocarbon concentration drops below the predetermined limit.

Catalytic combustion may be the best process whenever the concentration of hydrocarbon vapors does not exceed about 25% of the lower explosive limits (L.E.L.) for gasoline. For present purposes, L.E.L. is approximately equal to 1.7% by volume in air or approximately 17,000 ppm (v). With excess air, complete oxidation of vapors is achieved and the end results are non-hazardous substances, primarily carbon dioxide and water vapor. However, at high concentrations of gasoline vapors in air, heat given off during oxidation raises the temperature of the catalytic oxidizer to a point of destruction. Control of the temperature may be obtained by using dilution air ahead of the catalytic oxidizer, but this method of temperature control is often not practical at the high concentrations of gasoline vapor expected during the early phase of the vapor extraction process.

In the early phase, when recovered air or extraction vapor entering in line 35 has a high concentration of gasoline vapors (greater than 25% of L.E.L.), the discharge of vacuum compressor 36 is routed through lines 37, 41, 42, 43 and 44 to thermal combuster 45. Note that valve 40 is included in this flow path. The thermal combuster has provision for addition of supplementary fuel gas from line 46 through valve 47 so that a stable flame may be maintained and complete combustion occurs, reducing emissions to prescribed limits. At the beginning of the process, little or no gas make-up will be required as the concentration of gasoline vapors is likely to be high enough to burn on its own. After a time, however, the concentration of gasoline vapors will decline and some make-up fuel gas may be required. Eventually, the decline in concentration of hydrocarbon vapors will reach the point where catalytic oxidation becomes feasible, that is, below 25% of L.E.L. At this point, the operation will normally be switched to the second phase.

In the second phase, valve 40 is closed and valve 51 is opened so that the output of vacuum compressor 36 passes from line 41 through line 52, valve 51, through line 53, and finally into catalytic oxidizer 54 through line 55. The catalytic oxidizer is designed to reduce the hydrocarbon content of extracted vapor to a point below prescribed action limits. Treated air may be exhausted to the atmosphere through the same piping as was used for the thermal combuster. Thus, the output of the catalytic oxidizer passes through lines 61, 62, 63, 64, valve 65 and line 66 to line 43 where it then passes on and is exhausted through the thermal combuster exhaust to atmosphere. Note that the thermal combuster is entirely passive through this phase.

Integral with the catalytic processor is a heat exchanger 71 and electric heater 72 which ensure that the air/gasoline vapor mixture enters the catalyst bed at the right temperature. An additional means for achieving the incoming gas temperature necessary for proper operation of the catalytic oxidizer is a supply of supplemental fuel through valve 75 and line 76 to line 53 entering the oxidizer.

Operation of the system of the invention will now be described. Vacuum pump/compressor unit 36, which may be run by electric motor 38 or equivalent, provides the driving force for the vapor extraction process. Input line 35 normally connects to a collection manifold of the vapor extraction system. Dilution air is supplied through dilution air valve 77 and line 78. The concentration of hydrocarbons in the extraction vapor from pump 36 can be determined manually by an operator taking a sample by means of sampling port valve 81. Alternatively, a continuous analyzer 89 having a digital readout and a strip chart recorder could be connected to valve 81. If the hydrocarbon concentration is relatively high, at least higher than could safely be oxidized by the catalyst, valves 51 and 65 are closed and valve 40 is opened, supplying the extraction gas directly to thermal combuster 45. Operating and safety features include pressure relief valve 82 connected in the line between pump 36 and the combuster flame arrester 83 in the input line to the combuster, and pilot flame and ultraviolet sensor 84 at the combuster.

The thermal combuster may be referred to as a vapor control processor (VCP), constructed as an incinerator in which the extraction vapor is burned above a large number of gas jets for a low intensity, quiet flame. This is similar to a commercially available product.

As the hydrocarbon concentration of the extraction gas decreases, some time after commencement of the vapor treatment process, a point will be reached where combustion in the VCP is no longer self-sustaining. At that time valve 47 is opened to admit enrichment fuel as necessary to maintain clean, efficient and complete combustion. This enrichment fuel may be natural gas, liquified petroleum gas (LPG), or other clean-burning fuels.

After more operating time the hydrocarbon concentration normally has fallen to a predetermined threshold value so that the extraction vapor can be safely oxidized in the catalytic oxidizer. At that time, valve 40 is closed and valves 51 and 65 are opened. If the hydrocarbon concentration is still relatively high, dilution air from valve 77 may be added if necessary to adjust the concentration of combustible vapors and prevent overheating of the catalyst. If possible, it is preferred to employ the catalytic oxidizer mode of system operation. One reason is that lower operating temperatures are needed as compared with the thermal combuster, thereby saving energy when achieving the necessary temperature.

When the combustible gas content of the extraction vapor being oxidized catalytically in the system is relatively high, for example, in the range of 2000 ppm or more, the exotherm at the catalyst surfaces is relatively large, for example, 350° F. or more. In this case it is difficult to get the first catalyst chamber, in the typical two-stage reactor which is contemplated to be used, up to an efficient operating temperature, for example, in the range of 400° F. or higher, depending on the gas composition, without having the exothermic heat of oxidation overheat the second catalyst bed. The problem is particularly acute with extraction gas having a composition which includes components that are not efficiently oxidized at temperatures below about 600° F. Examples of such constituents include n-hexane and propane, among others.

A means of solving this problem is to employ an interstage cooler on the partially oxidized gas between the first and second stages of the catalytic oxidizer. The interstage cooler (not shown) is activated by closing a slide valve 85 between the first and second stage catalyst beds, thereby diverting the hot gas from the first stage through an external gas cooler before it is returned to enter the second state. An alternative is to inject dilution air through valve 86 and line 87 between the two catalyst stages. This can be accomplished by means of small blower or fan 88. Either the interstage cooler or the dilution air, or both, can be used to achieve the desired result.

The exhaust gas feedback line 61, 62, 63 is shown schematically to connect to the integral heat exchanger 71. Over an intermediate range of concentration, the catalytic oxidizer, with the heat exchanger, will operate efficiently, without external energy except for the nearly adiabatic heat from compressor 36 and some trim heat from the preheater. Trim heat is used as temperature control. The exhaust gas flows from the heat exchanger through line 64, valve 65 and line 66 back to lines 43 and 44 and then out the exhaust stack of the thermal combuster.

At still lower hydrocarbon concentrations, in the range of 1000 ppm and below, until the vapor extraction process is complete, the catalytic oxidizer operates efficiently using three or four heat inputs. Initially these are: (1) the heat of compression; (2) transferred heat of combustion by heat exchanger 71; and (3) electric power from temperature controlled internal heaters 72. However, at this low level of hydrocarbon concentration of the combustible gas, the exotherm within the catalytic oxidizer is relatively low. The principal heat source for maintaining the temperature of the catalyst beds at a level high enough for efficient oxidation is the preheater. Thus, preheater capacity becomes the limiting factor in overall extraction gas flow rate.

To increase operating efficiency and flow rate at these lower concentrations, a clean burning supplementary fuel is added to the extraction vapor through valve 75 and line 76. Acceptable supplementary fuel might be natural gas, propane, butane, light petroleum naptha and methanol, among others. Methanol is presently preferred because it is safe and easy to handle.

Heat from oxidation of the supplemental fuel is picked up by the extraction vapor in the heat exchanger, thereby increasing the temperature of the gas entering the catalytic oxidizer. The extraction gas flow rate through the system, specifically through the catalytic oxidizer, can thereby be increased above the limit previously imposed by the limited capacity of the preheater.

Additional safety features of the system include pressure sensor 91 connected between line 37 from compressor 36 and electric shut off 92. Temperature sensor 93 monitors the output temperature of the catalytic oxidizer and is also connected to the electric shut off. Both devices are to protect the system in case of excessive pressure or heat, respectively.

In addition to input condition sampling port valve 81 there is catalytic oxidizer output sampling port valve 94. This is to enable the operator to determine the condition of the output gas.

An alternative embodiment of the multi-mode system is shown in FIG. 2. In this embodiment internal combustion engine 101 replaces the thermal combuster of FIG. 1. This can accomplish the desired task with less cost to the end user because such an engine may already be available on site. This embodiment is particularly suited to field operations where the multi-mode combuster is skid- or trailer-mounted in conjunction with an engine-driven generator. This embodiment could be preferred when 5 to 10 kW of electric power is not readily available on site.

To operate in balance, that is, using as much air to engine 101 as is pumped by the vacuum compressor, valve 40 may have to be partially throttled back. This would reduce flow volume and make the catalytic oxidizer mode even more preferential. However, operation for a few days at high hydrocarbon concentrations employing engine 101 as the thermal combuster can provide the necessary oxidation until concentration levels decrease so that the catalytic oxidizer mode can become operative. This would save the cost of installation of a VCP unit.

When the internal combustion engine is used, it may be necessary for application of supplementary fuel such as gasoline, diesel, LPG, or methanol, depending on the type of engine involved. This fuel is applied through valve 102 and line 103. The clean air from the engine is discharged through exhaust 104, which may be fitted with a standard automotive exhaust catalytic converter.

When the embodiment of FIG. 2 is used and is in the catalytic oxidizer mode, the output from the oxidizer will be by means of exhaust 105 to atmosphere, downstream from the heat exchanger, rather than through the thermal combuster.

Engine 101 may be a motor-generator set. When such configuration is used, line 106 indicates electrical supply to electric motor 38. Alternatively, engine 101 may be employed to directly drive compressor 36, as indicated by connection line 107. Thus, there would be no need for electric motor 38.

In some cases it may be possible to use only the internal combustion engine, without the catalytic oxidizer.

For the specific purpose of abatement of VOC in the ground or soil, a portion of the complete multi-mode combuster of FIGS. 1 and 2 may be employed to advantage. With reference to FIG. 1, that portion of the system relating to the thermal combuster and the associated pipes and valves would be omitted. The system would comprise means 35 for access to extraction vapor from the contaminated soil, vacuum pump compressor 36 and catalytic oxidizer 54. The preheating means, dilution air, power and safety features would likely all remain as part of the system for use as necessary.

Operation of this system need not be described further here since it is essentially the same as discussed in detail above upon closure of valve 40. The catalytic oxidizer would have an exhaust directly to atmosphere rather than through the quiescent thermal combuster.

In view of the above description it is possible that modifications and improvements will occur to those skilled in the applicable art which are within the scope of the claims.

What is claimed is:

1. Multi-mode oxidation apparatus for cleansing air contaminated by volatile organic compounds (VOC) in an exothermic reaction, said apparatus comprising:
   a source of air contaminated by VOC of uncontrolled and varying concentrations;
   conduit means connected to said source of the VOC contaminated air;
   thermal combustion means having an input for the VOC contaminated air and an exhaust to atmosphere of carbon dioxide and water vapor;
   a catalytic oxidizer having an input port for the VOC contaminated air and an exhaust to atmosphere of carbon dioxide and water vapor; and
   means for selectively coupling said conduit means to said thermal combustion means input and to said catalytic oxidizer input port, depending on the concentration of VOC in the input VOC contaminated air.

2. The apparatus recited in claim 1, wherein said thermal combustion means is an incinerator.

3. The apparatus recited in claim 1, and further comprising a source of clean burning enrichment fuel selectively connected to said input of said thermal combustion means.

4. The apparatus recited in claim 1, and further comprising vacuum pump/compressor means in said conduit means.

5. The apparatus recited in claim 1, wherein:
   said catalytic oxidizer is a two-stage device having first and second catalytic beds;
   said oxidation apparatus further comprises an interstage cooler operating on the partially oxidized gas between said first and second catalyst beds.

6. The apparatus recited in claim 1, wherein:
   said catalytic oxidizer is a two-stage device having first and second catalytic beds;
   said oxidation apparatus further comprising means for adding dilution air between said first and second catalyst beds.

7. The apparatus recited in claim 1, and further comprising vacuum pump/compressor means in said conduit means for supplying said contaminated air to said catalytic oxidizer and to said thermal combustion means.

8. The apparatus recited in claim 1, and further comprising valve means connected in said conduit means between the contaminated air source and said inputs to said thermal combustion means and catalytic oxidizer, said valve means selectively adding dilution air to the contaminated air, depending on the VOC concentration therein.

9. The apparatus recited in claim 8, and further comprising sampling port means whereby the contaminated air may be sampled and the VOC concentration determined.

10. The apparatus recited in claim 1, wherein said selective coupling means comprises valve means adapted to selectively connect and isolate said thermal combustion means and said catalytic oxidizer to and from said conduit means.

11. The apparatus recited in claim 10, wherein said valve means comprises:
    a first valve connected between said thermal combustion means and said conduit means; and
    a second valve connected between said catalytic oxidizer and said conduit means.

12. The apparatus recited in claim 1, and further comprising:
    a heat exchanger coupled to said input port of said catalytic oxidizer; and
    exhaust gas conduit means connected to said exhaust of said catalytic oxidizer and passing through said heat exchanger in a heat exchange relation with the contaminated air entering said input port of said catalytic oxidizer.

13. The apparatus recited in claim 12, and further comprising means for selectively connecting said exhaust gas conduit means to said thermal combustion means input.

14. The apparatus recited in claim 12, and further comprising heater means coupled to said input port of said catalytic oxidizer.

15. The apparatus recited in claim 12, and further comprising a source of supplemental fuel selectively connected to said input port of said catalytic oxidizer to increase the temperature of the exhaust gas from said catalytic oxidizer and thereby increase the temperature of incoming contaminated air through said heat exchanger.

16. A multi-mode combuster for treatment of extraction vapor containing VOC, said combuster comprising:
    conduit means adapted to be connected to a source of the extraction vapor;
    thermal combustion means having an input and an exhaust to atmosphere:
    a catalytic oxidizer having an input port and an exhaust to atmosphere;
    vacuum pump/compressor means in said conduit means;
    means coupled to said conduit means for selectively supplying dilution air to the extraction vapor, depending on the VOC concentration therein;
    valve means for selectively coupling said conduit means to said input of said thermal combustion means and said input port of said catalytic oxidizer;
    a source of clean burning enhancement fuel selectively connected to said input of said thermal combustion means;
    a heat exchanger coupled to said input port of said catalytic oxidizer;
    exhaust gas conduit means connected to said exhaust of said catalytic oxidizer and passing through said heat exchange in a heat exchange relation with the extraction vapor entering said input port of said catalytic oxidizer;
    means for selectively connecting said exhaust gas conduit means to said thermal combustion means;
    heater means coupled to said input port of said catalytic oxidizer; and
    a source of supplemental fuel selectively connected to said input port of said catalytic oxidizer to increase the temperature of the exhaust gas from said catalytic oxidizer and thereby increase the temperature of incoming extraction vapor in said heat exchanger.

17. The multi-mode combuster recited in claim 16, and further comprising sampling port means whereby the extraction vapor and the exhaust gas may be sampled and the hydrocarbon concentration determined.

18. Multi-mode oxidation apparatus for cleansing extraction vapor containing VOC in an exothermic reaction, said apparatus comprising:
   a source of extraction vapor containing VOC of uncontrolled and varying concentrations;
   conduit means connected to said source of the extraction vapor;
   thermal combustion means having an input and an exhaust to atmosphere, said thermal combustion means comprising an internal combustion engine;
   a catalytic oxidizer having an input port and an exhaust to atmosphere;
   vacuum pump/compressor means in said conduit means;
   means coupled to said conduit means for selectively supplying dilution air to the extraction vapor, depending on the VOC concentration therein;
   valve means for selectively coupling said conduit means to said input of said thermal combustion means and said input port of said catalytic oxidizer;
   a source of clean burning enhancement fuel selectively connected to said input of said thermal combustion means;
   a heat exchanger coupled to said input port of said catalytic oxidizer;
   exhaust gas conduit means connected to said exhaust of said catalytic oxidizer and passing through said heat exchanger in a heat exchange relation with the extraction vapor entering said input port of said catalytic oxidizer;
   heater means coupled to said input port of said catalytic oxidizer; and
   a source of supplemental fuel selectively connected to said input port of said catalytic oxidizer to increase the temperature of the exhaust gas from said catalytic oxidizer and thereby increase the temperature of incoming extraction vapor in said heat exchanger.

19. A multi-mode combuster for treatment of air contaminated by volatile organic compound (VOC), said combuster comprising:
   conduit means adapted to be connected to a source of the contaminated air;
   thermal combustion means comprising an internal combustion engine having an input and exhaust to atmosphere;
   a catalytic oxidizer having an input port and an exhaust to atmosphere; and
   means for selectively coupling said conduit means to said internal engine input and to said catalytic oxidizer input port.

20. The apparatus recited in claim 19, and further comprising:
   vacuum pump/compressor means in said conduit means;
   said internal combustion engine being coupled to said compressor means to supply operative power thereto.

21. The apparatus recited in claim 19, and further comprising:

a heat exchanger coupled to said input port of said catalytic oxidizer; and
   exhaust gas conduit means connected to said exhaust of said catalytic oxidizer and passing through said heat exchanger in a heat exchange relation with the contaminated air entering said input port of said catalytic oxidizer;
   said exhaust gas being exhausted to atmosphere after passing through said heat exchanger.

22. The apparatus recited in claim 19 wherein said internal combustion engine comprises a motor-generator set.

23. The apparatus recited in claim 22, and further comprising:
   vacuum pump/compressor means in said conduit means;
   an electric motor for powering said compressor means;
   said generator of said motor-generator set being connected to said electric motor to supply electrical power thereto.

24. Vapor contamination abatement apparatus for cleansing vapor extracted from soil contaminated by VOC, said apparatus comprising:
   a source of the extracted vapor contaminated by VOC of uncontrolled and varying concentrations;
   conduit means connected to said source of the contaminated vapor;
   vacuum pump/compressor means connected in said conduit means for extracting the contaminated vapor from the soil, said vacuum pump/compressor means having its input connected to said source conduit means and having an output;
   means for oxidation of the vapor contaminants;
   conduit means connected between said vacuum pump/compressor means output and said oxidation means;
   means for selectively supplying enrichment fuel to the VOC contaminated extraction vapor;
   means for selectively supplying dilution air to the VOC contaminated extraction vapor; and
   valve means connected in said conduit means between the contaminated vapor source and said input to said oxidation means, said valve means selectively adding dilution air to the contaminated vapor, depending on the VOC concentration therein.

25. The apparatus recited in claim 24, wherein said oxidation means is a catalytic oxidizer.

26. The apparatus recited in claim 24, wherein said oxidation means comprises:
   a catalytic oxidizer having an input and an exhaust;
   thermal combustion means; and
   means for selectively connecting said output of said vacuum pump/compressor means to said catalytic oxidizer and to said thermal combustion means.

27. The apparatus recited in claim 24, and further comprising sampling port means whereby the contaminated vapor may be sampled and the VOC concentration determined.

28. The apparatus recited in claim 24, and further comprising an electric motor for powering said compressor means.

29. The apparatus recited in claim 26, wherein said selective connecting means comprises valve means adapted to selectively connect and isolate said thermal combustion means and said catalytic oxidizer to and from said vacuum pump/compressor means.

30. Vapor contamination abatement apparatus for cleansing vapor extracted form soil contaminated by VOC, said apparatus comprising:
- a source of the extracted vapor contaminated by VOC of uncontrolled and varying concentrations;
- conduit means connected to said source of the contaminated vapor;
- vacuum pump/compressor means connected in said conduit means for extracting the contaminated vapor from the soil, said vacuum pump/compressor means having its input connected to said source conduit means and having an output;
- means for oxidation of the vapor contaminants comprising a catalytic oxidizer;
- conduit means connected between said vacuum pump/compressor means output and said catalytic oxidizer;
- means for selectively supplying enrichment fuel to the VOC contaminated extraction vapor;
- means for selectively supplying dilution air to the VOC contaminated extraction vapor;
- an input line and an exhaust line connected to said respective input and exhaust of said catalytic oxidizer;
- a heat exchanger coupled in said input line of said catalytic oxidizer; and
- exhaust gas conduit means connected to said exhaust of said catalytic oxidizer and passing through said heat exchanger in a heat exchange relation with the contaminated vapor in said input line.

31. The apparatus recited in claim 30, and further comprising heater means coupled to said input of said catalytic oxidizer.

32. The apparatus recited in claim 30, and further comprising a source of supplemental fuel selectively connected to said input of said catalytic oxidizer to increase the temperature of the exhaust gas from said catalytic oxidizer and thereby to increase the temperature of incoming contaminated vapor through said heat exchanger.

33. The apparatus recited in claim 30, wherein:
- said catalytic oxidizer is a two-stage device having first and second catalyst beds; and
- said apparatus further comprises an interstage cooler operating on the partially oxidized gas between said first and second catalyst beds.

34. The apparatus recited in claim 30, wherein:
- said catalytic oxidizer is a two-stage device having first and second catalyst beds; and
- said apparatus further comprises means for adding dilution air between said first and second catalyst beds.

* * * * *